US 8,502,498 B2

(12) United States Patent
Fecher

(10) Patent No.: US 8,502,498 B2
(45) Date of Patent: Aug. 6, 2013

(54) LOCALIZED CHARGING OF ELECTRIC VEHICLES

(75) Inventor: Dana B. Fecher, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 279 days.

(21) Appl. No.: 13/009,539

(22) Filed: Jan. 19, 2011

(65) Prior Publication Data

US 2012/0181982 A1 Jul. 19, 2012

(51) Int. Cl.
*H02J 7/00* (2006.01)
*B60L 9/00* (2006.01)
*B60W 10/24* (2006.01)

(52) U.S. Cl.
USPC ............................ 320/109; 701/22; 180/65.29

(58) Field of Classification Search
USPC ............................ 320/109; 701/22; 180/65.29
See application file for complete search history.

(56) References Cited

U.S. PATENT DOCUMENTS

| 8,330,415 | B2 * | 12/2012 | Sato et al. | 320/109 |
| 2008/0180058 | A1 * | 7/2008 | Patel et al. | 320/109 |
| 2011/0004358 | A1 * | 1/2011 | Pollack et al. | 700/297 |
| 2011/0031929 | A1 * | 2/2011 | Asada et al. | 320/109 |
| 2011/0078092 | A1 * | 3/2011 | Kim et al. | 705/412 |
| 2011/0093127 | A1 * | 4/2011 | Kaplan | 700/292 |
| 2011/0282527 | A1 * | 11/2011 | Inbarajan et al. | 701/22 |
| 2012/0173061 | A1 * | 7/2012 | Hanley et al. | 701/22 |

* cited by examiner

*Primary Examiner* — M'Baye Diao
(74) *Attorney, Agent, or Firm* — Leydig, Voit & Mayer, Ltd.

(57) ABSTRACT

The described method and system provide for managing the charging of individual electric vehicles with respect to local substations or grids to lower the load on a given substation or grid. When the load on a substation or grid reaches a warning threshold, a call center may facilitate the implementation of a charging plan to reduce the load. The call center may locate and identify vehicles that are being charged in the relevant area and may further manage the charging of the located vehicles to reduce the load through a charging plan. The plan may be based on the current state of charge of each vehicle, the historical use and projected use of each vehicle, vehicle charging patterns, and the severity of the load on the substation or grid.

20 Claims, 4 Drawing Sheets

LOCALIZED CHARGING OF ELECTRIC VEHICLES

BACKGROUND OF THE INVENTION

The technology utilized to store, manage, and consume power in electrically-powered vehicles has been improving steadily. Indeed, electrically-powered vehicles (hereinafter electric vehicles) are now competitive with fuel-powered vehicles on many performance parameters, and typically surpass fuel-powered vehicles in measures of efficiency, environmental cleanliness, and operating noise levels. This has led to an increase in the popularity of electric vehicles and hence to a steady increase in the number of such vehicles on the road and in use at any given time.

As electrically-powered vehicles continue to increase in number and popularity, the infrastructure used to charge such vehicles, such as electricity distribution systems, will become increasingly stressed. Local electrical substations are part of larger electricity generation, transmission and distribution systems (also referred to as electrical grids) where electrical power may be generated and transmitted to a local area serviced by the electrical substation. An electrical substation servicing an area may be stressed when numerous electric vehicles are charging simultaneously under certain conditions in the affected area. Thus, for example, when power draw on the grid increase to an unusual level, such as during periods of high temperature, the additional draw caused by charging numerous electric vehicle batteries may exacerbate an already existing infrastructure load problem.

Indeed, ground-level ambient air temperatures frequently exceed 100° F. for prolonged periods of time in the American Southwest during summer. Under these types of conditions, especially in urban and residential areas, large amounts of electrical energy are consumed by climate control systems for the cooling of residences, businesses, non-profit and government facilities. An additional load caused by a large number of electric vehicles being charged could overstress the already fragile grid, bring local substations, and consequently the grid, to a point of failure.

Thus, it is an object underlying certain implementations of the described principles to provide a system for efficiently and effectively adjusting the charging of individual vehicles based on vehicle history and projected vehicle usage, in part to avoid the above-noted problems where applicable. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for managing the charging of individual electric vehicles with respect to local substations or grids to lower the load on a given substation or grid. When the load on a substation or grid reaches a certain level, i.e., a warning threshold, the substation or grid may communicate to a call center information relating to the load on the substation or grid so that the call center may facilitate the implementation of a charging plan to reduce the load. The call center may locate and identify vehicles that are being charged in the relevant area (i.e. in the service area serviced by the substation or connected to the relevant grid), and may further manage the charging of the located vehicles to reduce the load by implementing a charging allocation plan. The load may be reduced by reducing or suspending/deferring the flow of charge to certain vehicles, and which vehicles are affected may be determined based on the vehicles' historical and/or projected use.

Alternatively, the allocation of charge between vehicles may be determined based on more generalized algorithms or other factors, such as repeating vehicle charge patterns. Furthermore, if the load on the substation or grid is severe, the charging allocation plan may be modified such that the charging of relatively more vehicles may be suspended or reduced by a greater amount.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for managing the charging of individual electric vehicles with respect to local substations or grids to lower the load on a given substation or grid. When the load on a substation or grid reaches a warning threshold, a call center may facilitate the implementation of a charging plan to reduce the load. The call center may locate and identify vehicles that are being charged in the relevant area and may further manage the charging of the located vehicles to reduce the load. In one implementation, the vehicles may be electric vehicles equipped with telematics units, and the call center may be a telematics service provider call center, capable of communicating with vehicles through the telematics units equipped on the vehicles.

Figure 1:
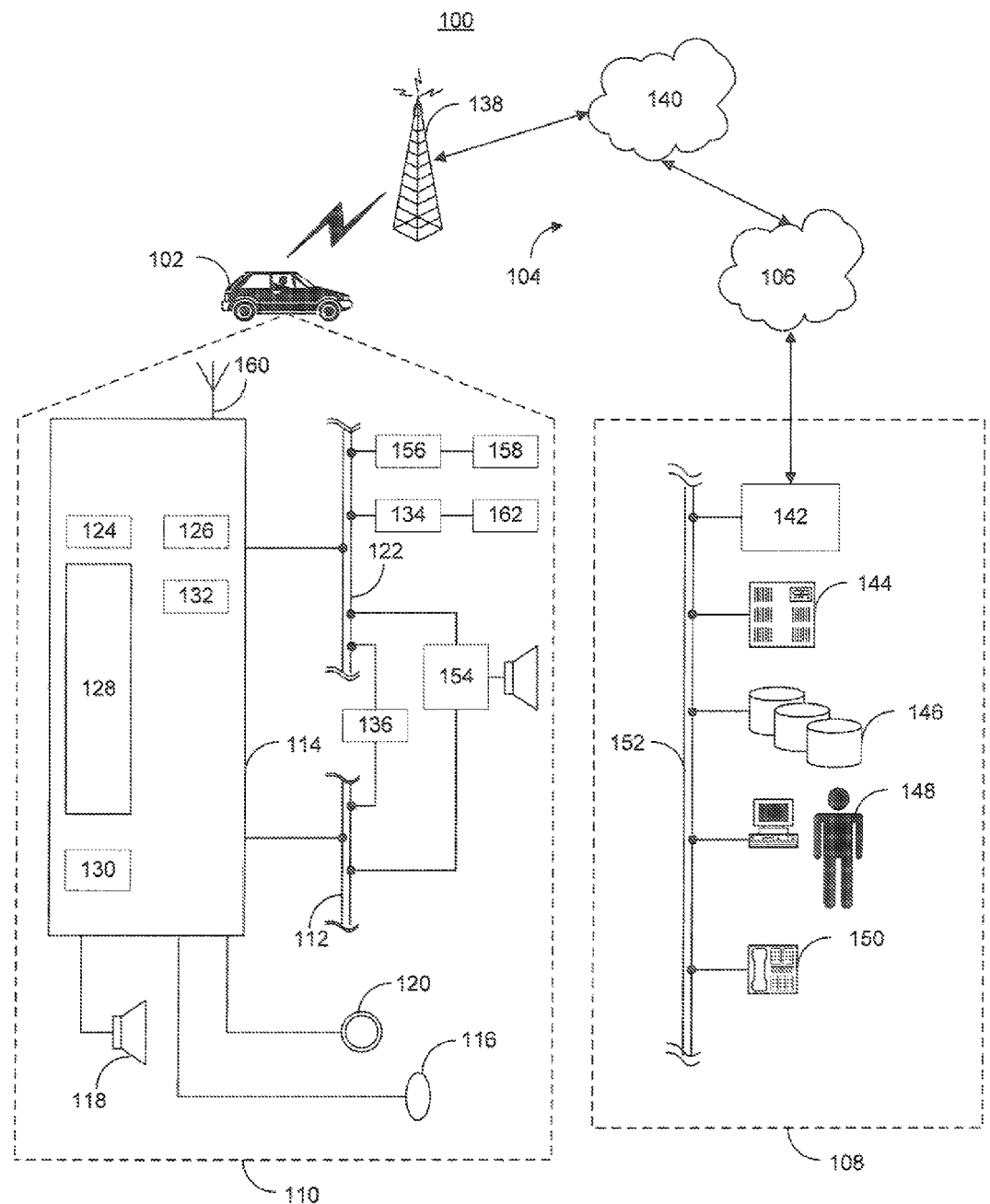
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be, appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
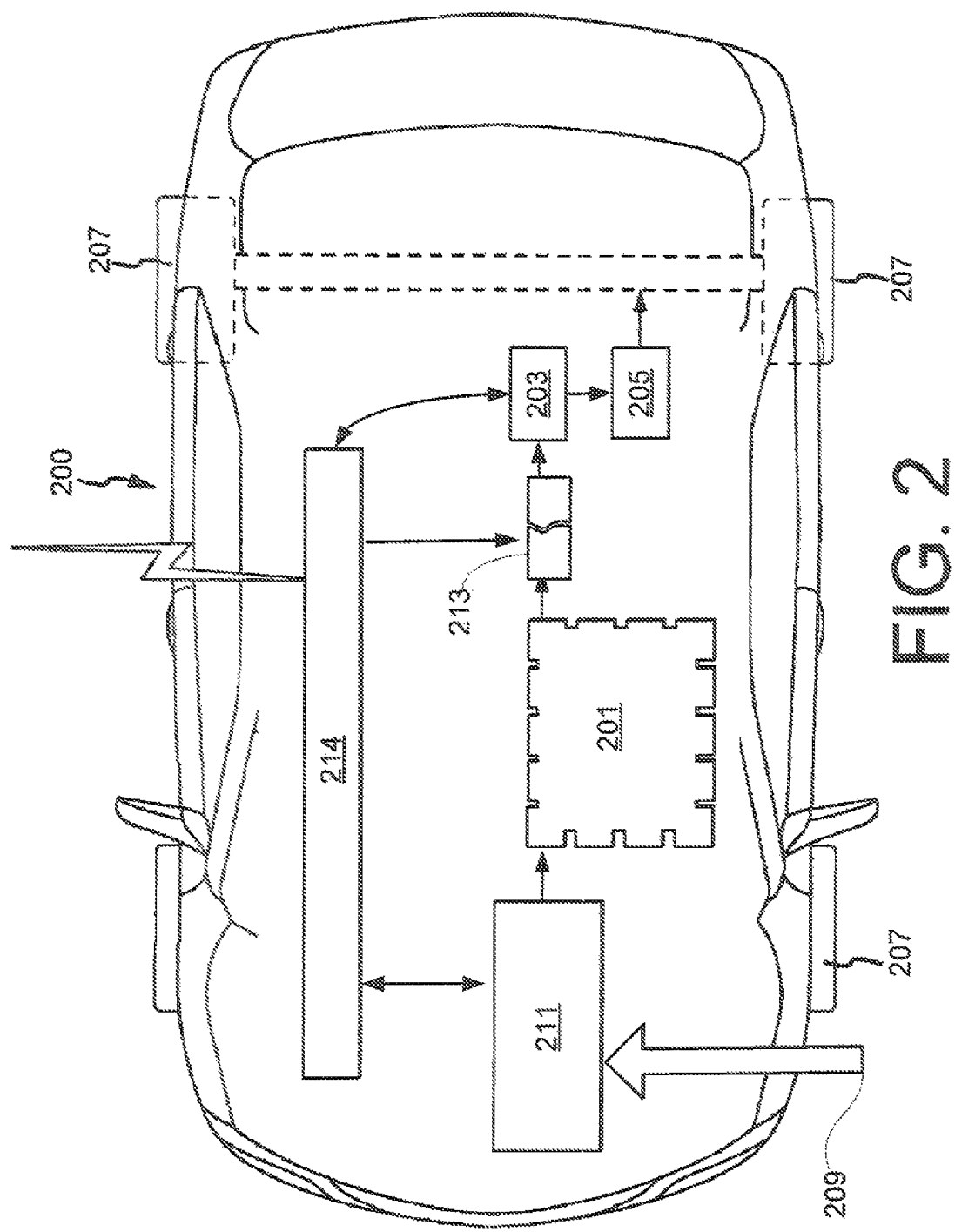
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries, and Lithium Polymer batteries.

The battery 201 is conductively linkable, e.g., via a motor controller 203, to an electrical drive unit 205, e.g., an electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 211 as discussed above and to convey data regarding the battery as will be discussed more, fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state.

Figure 3:
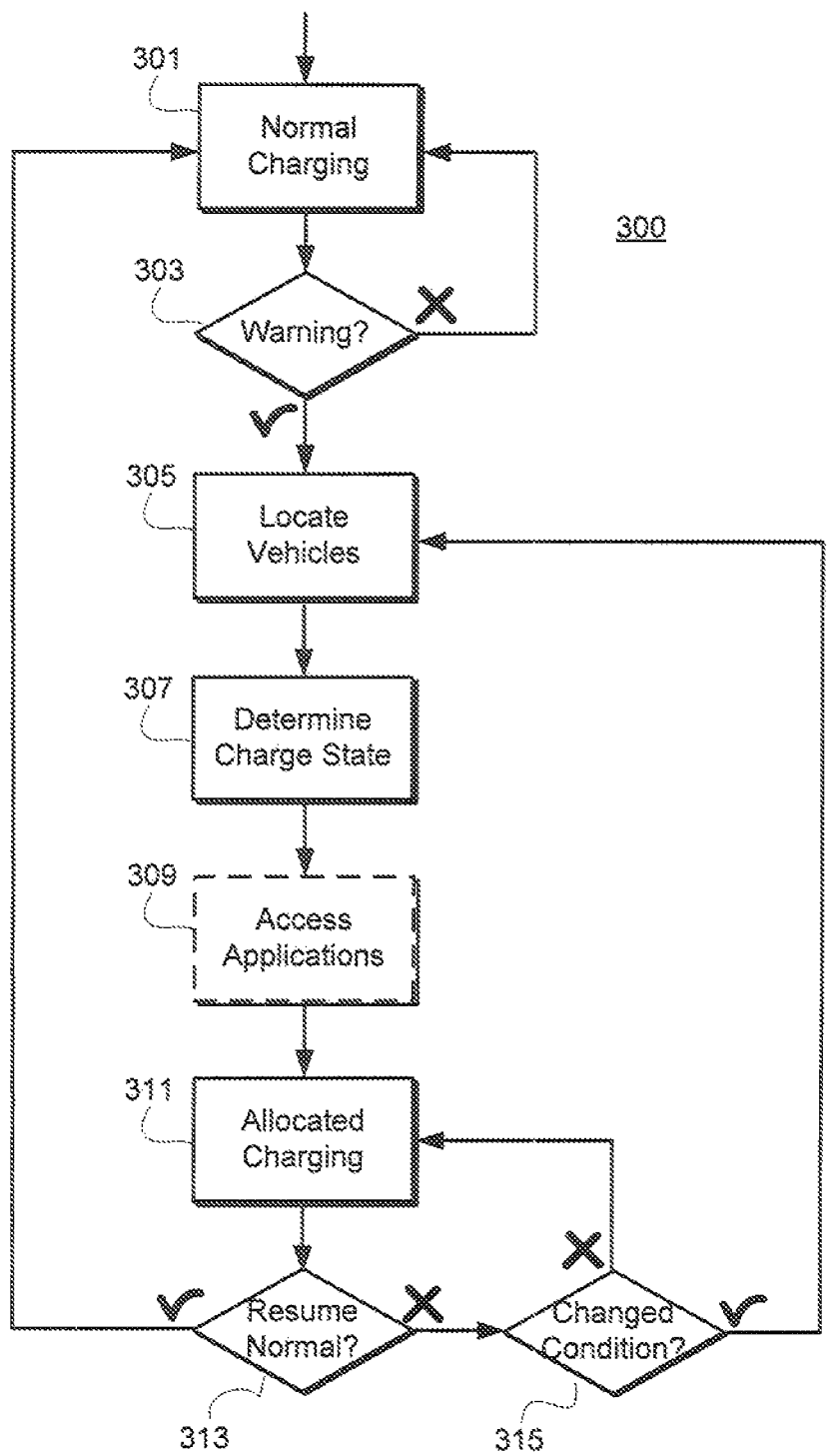
FIG. 3 is a flowchart illustrating a process for managing the charging of individual vehicles in accordance with an implementation of the described principles.

With further reference to the architecture of FIGS. 1 and 2, and turning more specifically to FIG. 3, a process 300 for localized management of the charging of electric vehicles to reduce load on a substation or grid is depicted. Generally, when an electric vehicle is plugged into a charging station, "normal" charging 301 takes place wherein the vehicle battery is charged according to a typical charging process. It will be appreciated that the particular parameters of the typical charging process such as the rate and amount of charge flow may be arbitrary, and the parameters may be set by a utility company or may be determined by hardware associated with the electricity distribution system or the vehicle such as the vehicle itself, connectors connecting the vehicle to the charging station, the charging station, or a telematics unit on the vehicle.

In an implementation of the present invention, this "normal" charging 301 may continue for all electric vehicles plugged in to a charging station within a service area serviced by a substation or grid while the load on the substation or grid remains below a certain warning threshold. If the load remains below the warning threshold 303, normal charging may continue. If the load reaches or surpasses the warning threshold 303, localized management of charging may take place to reduce the load.

In a further implementation, when the load on the substation or grid reaches or surpasses the warning threshold, the utility may notify a call center that the warning threshold has been reached or surpassed. In alternative implementations, the call center may monitor the load on the substation or grid, such as through receiving periodic or continuous updates from the utility, and determine whether the load has reached the warning threshold. In yet another further implementation, the utility may communicate to the call center the location or bounds of the service area of the substation or grid that has reached the warning threshold. Alternatively, the call center may already have this information stored at the call center. It will be appreciated by one skilled in the art that the utility may communicate with the call center through any conventional means, such as by sending data over a network, and the warning threshold may be arbitrarily set at an arbitrary level of load.

The call center may locate or identify vehicles 305 that are being charged in the service area serviced by the substation or grid by communicating with the vehicles through the telematics units equipped on the vehicles or by communicating with hardware connected to the vehicle, such as smart meters and connectors that may be part of a charging station. The call center may further determine the current charge state 307 for each of the vehicles being charged through communication with the vehicle's telematics unit or other hardware connected to the vehicle.

In one implementation, the call center may further access calendar or history applications 309 for each charging vehicle to determine a historical profile of vehicle use or to determine a projected use. In a further implementation, the call center may determine the short-term projected use—for example, that the vehicle will be or will likely be driven for ten miles within the next day. This determination of short-term projected use may be based on the historical profile of vehicle use—for example, if a vehicle is driven ten miles every Monday for the past five weeks, the call center or application may determine on a Sunday that the vehicle will likely be driven for ten miles on the following day—or it may be based on a calendar application for estimated use—for example, a user inputting into an application that the vehicle will be driven for ten miles on the following day.

Based on the information that the call center obtains regarding the charge state of each vehicle 307 and from accessing the calendar or history applications 309 for each vehicle, the call center may determine a plan for charging the vehicles to reduce the load on the substation or grid, i.e., a charging allocation plan. For example, the plan may prioritize charging vehicles with a lower charge state over vehicles with a higher charge state and prioritize charging vehicles with higher projected use over vehicles with lower projected use. One skilled in the art will appreciate that numerous methods and algorithms may be implemented and the possible charging allocation plans are not limited to those described herein.

For example, in one implementation, each vehicle may be classified into a number of categories such as low and high current state of charge and low and high projected use. A simple plan may be allow normal charging of vehicles with low current charge and high projected use while suspending or reducing charging for vehicles with low current charge and low projected use, vehicles with high current charge and low projected use, and vehicles with high current charge and high projected use. After the vehicles with low current charge and high projected use have reached a certain charge level, normal charging of other vehicles may be allowed. Alternatively, another plan may be to allow normal charging of vehicles with low current charge and high projected use, reduce charging by a small amount for vehicles with low current charge and low projected, use, and suspend charging for vehicles with high current charge. In yet another further implementation, charging of certain vehicles, such as those with high current charge, may simply be deferred to a more optimal time with respect to the substation or grid (i.e. when there is less of a load on the substation or grid).

In other implementations, the plan may be very specific, such as by being based on the particular level of charge of each vehicle and/or the particular projected use of each vehicle, or being based on a formula involving the current level of charge and the projected use. To give an illustrative example, a simple formula may be used, such as taking the percentage of current charge and simply subtracting the number of projected miles, and prioritizing the vehicles that produce the lowest values. Given vehicles A, B, and C, in this example, with vehicle A having a current charge level of 30% and a projected use of 30 miles in the next day, vehicle B having a current charge level of 60% and a projected use of 50 miles in the next day, and vehicle C having a current charge level of 80% and a projected use of 10 miles the next day, a charging allocation plan according to this formula may prioritize the charging of vehicle A (30−30=0) over vehicle B (60−50=10) over vehicle C (80−10=70).

One skilled in the art will also appreciate there are numerous ways in which the priority may be implemented. For example, vehicle A may be prioritized by allowing normal charging of vehicle A while suspending charging of vehicles B and C until vehicle. A is charged to a certain level, and then allowing normal charging of vehicle B while suspending the charging of vehicle C. Alternatively, vehicle A may be prioritized by allowing normal charging of vehicle A while reducing the charge flow to vehicle B by a first amount and reducing the charge flow to vehicle C by a second, greater amount. Or, in yet another further implementation, the charge flow to all three vehicles may be reduced, with the charge flow of vehicle A being reduced the least.

In yet another implementation, the call center may skip over the step of accessing applications 309 for each of the charging vehicles and implement a "macroized" charging allocation plan based on vehicle charge patterns. In this implementation, if the same vehicle charge patterns frequently repeat, the call center may determine the charging allocation plan based on those patterns, such as by prioritizing vehicles that often require more charging over those that usually require relatively less charging.

In yet another further implementation, the charging allocation plan may be further based on the severity of the load on the substation or grid. For example, if the load is very severe, all vehicle charging could be completely suspended. In other implementations, if the load is severe, the plan may be modified to incorporate a greater reduction of charge flow across the board, or to suspend or reduce the charging of relatively more vehicles.

After a charging allocation plan has been determined, the plan may be implemented 311. One skilled in the art will appreciate that the plan may be carried out in a number of ways. For example, the call center may communicate the plan to the substation or grid, and the substation or grid may control the amount of electricity distributed to each of the vehicles through the charging stations according to the plan. In another example, the call center may communicate the plan to the telematics units, connectors, or smart meters associated with the charging vehicles or charging station and the telematics units, connectors, or smart meters may limit or suspend the charge flow to the plugged-in vehicles. In one implementation, the call center may specify certain parameters to the telematics units, connectors, or smart meters, such as the amount of charge flow to allow and the duration for which that amount of charge flow should be allowed for according to the plan.

While the vehicles are being charged according to the charge allocation plan 311, the substation or grid may communicate to the call center that the substation or grid is no longer overloaded and that normal charging may be resumed 313. If the call center determines that normal charging may be resumed 313, the call center may stop implementing the charge allocation plan and communicate to the substation, grid, vehicles or charging stations to return to normal charging 301. In yet another further implementation, if the call center determines that a condition has changed 315, such as a new vehicle being plugged in or a currently charging vehicle being unplugged, the call center may repeat the location, identification, determination of charge state, access of application, or determination of allocated charge plan processes to modify the allocated charge plan to account for the change in condition 315. If no change of condition is determined by the call center 315 and the substation or grid is not ready to resume normal charging 313, the allocated charging plan 311 may continue to be implemented without modification.

Figure 4:
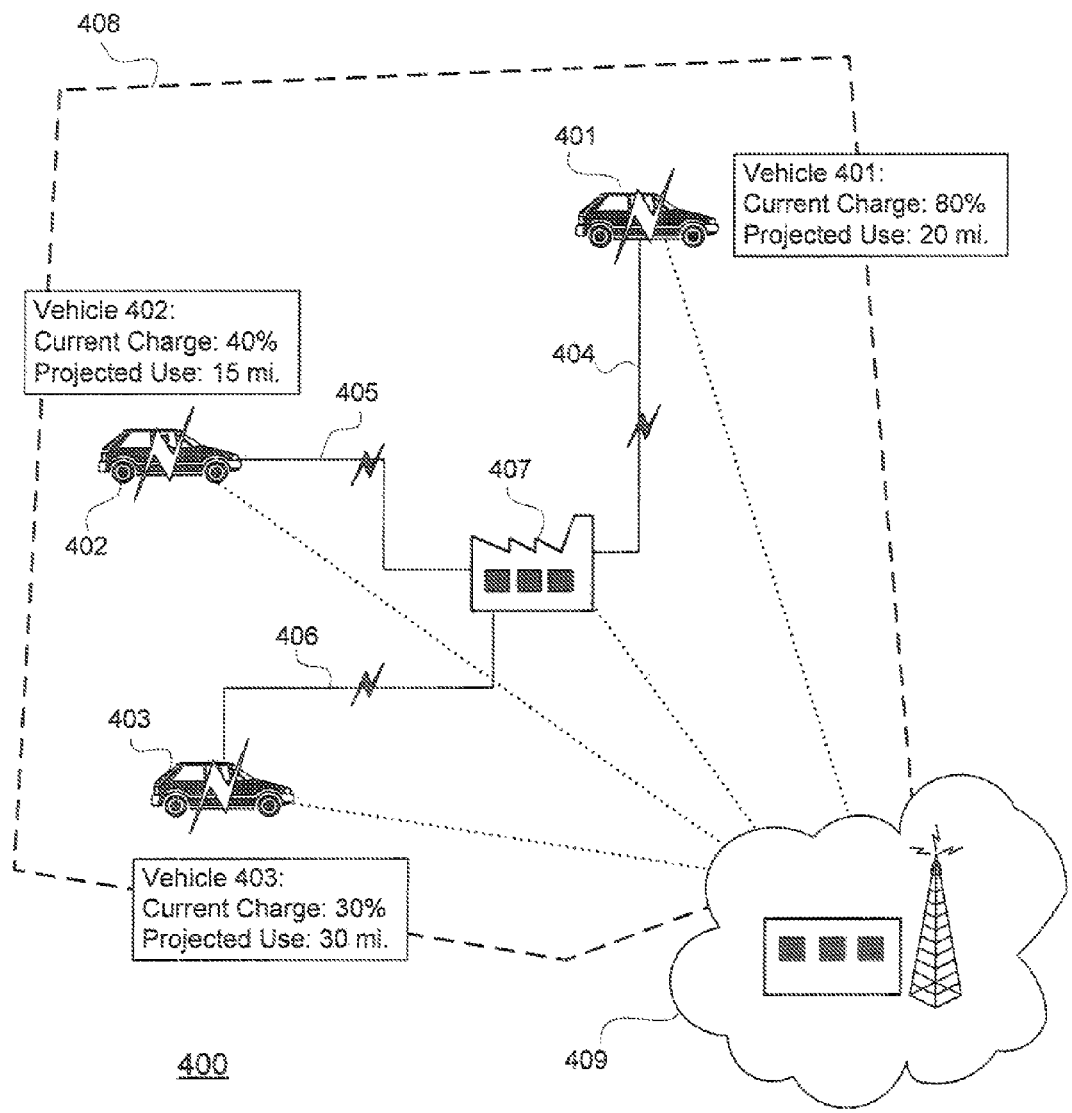
FIG. 4 is an example of a map of a local service area illustrating the role of vehicles being charged, a local substation, and a call center in accordance with an implementation of the described principles.

With further reference to the architecture of FIGS. 1 and 2 and the process of FIG. 3, and turning more specifically to FIG. 4, an example of a map 400 of a local service area is depicted to illustrate the relationship between the call center, charging vehicles, and substation in one exemplary implementation. The substation 407 is connected to charging vehicles 401, 402 and 403 via a distribution network which includes transmission lines 404, 405 and 406, respectively. The vehicles 401, 402 and 403 may be plugged in at a home or some other charging station, and are within local service area 408 associated with substation 407. A call center 409 communicates via a wireless network with each of the charging vehicles 401, 402, and 403, as well as the substation 407. In one implementation, when the substation 407 reaches a warning threshold, it notifies the call center 409. The call center 409 then determines that vehicles 401, 402 and 403 are charging within the local service area 408, and accesses applications for each of the vehicles to determine the current level of charge and projected use for the next day of each vehicle.

In this example, vehicle 401 has a current charge of 80% and projected use of 20 miles, vehicle 402 has a current charge of 40% and a projected use of 15 miles, and vehicle 403 has a current charge of 30% and a projected use of 30 miles. The call center 409 may then determines a charge allocation plan based on these amounts. For example, the call center 409 may determine a plan which allows vehicle 401 to engage in normal charging until vehicle 401 reaches a 90% charge state while vehicle 402 engages in reduced charging and vehicle 403 has charging suspended. When vehicle 401 reaches the 90% charge state, vehicle 402 may be allowed to engage in normal charging and vehicle 403 may be allowed to engage in reduced charging. One skilled in the art will appreciate that this is merely one example to illustrate the inventive principles and that the invention is not limited to this example.

In yet another further implementation, subscribers to the telematics service provider may have the option of opting-in to the charge allocation plan in exchange for a reduced charging rate, and thus, when the call center locates and identifies vehicles within the service area, it only incorporates those vehicles which have been opted-in into the charge allocation plan. Vehicles which have not been opted-in may not be subjected to reduced or suspended charging.

It will be appreciated that the described system allows for managing the charging of individual electric vehicles with respect to local substations or grids to lower the load on a given substation or grid. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for managing, using a call center, charging of multiple electric vehicles to reduce overall electrical load by the multiple electric vehicles during charging, the method comprising:
    determining, at the call center, that at least one of a substation and a grid has reached a warning threshold of power consumption;
    identifying, at the call center, the multiple vehicles that are charging in a service area serviced by at least one of the substation and the grid;
    determining, at the call center, a charge level of a battery of each of the multiple vehicles; and
    implementing, by the call center, a charge allocation plan for charging the multiple vehicles such that at least one of the substation and the grid is subject to a lower load by the multiple vehicles being charged in the service area.

2. The method of claim 1, the method further comprising:
    accessing at least one application for each of the multiple vehicles charging in the service area, wherein the at least one application includes information regarding at least one of historical vehicle use and projected vehicle use.

3. The method of claim 2, wherein the charge allocation plan for charging the multiple vehicles is based on the determination of charge level and at least one of the historical vehicle use and projected vehicle use.

4. The method of claim 1, wherein the charge allocation plan is based on vehicle charge patterns in the service area serviced by at least one of the substation and the grid.

5. The method of claim 1, wherein the determining that at least one of the substation and the grid has reached a warning threshold further comprises:
    receiving, at the call center, a notification from at least one of the substation and the grid that at least one of the substation and the grid has reached a warning threshold.

6. The method of claim 1, wherein the step of determining a charge level of a battery of each of the multiple vehicles further comprises:
    receiving, at the call center, information from a telematics unit of each of the vehicles including the charge level of the battery of the vehicle.

7. The method of claim 1, wherein the charge allocation plan includes at least one of suspending and decreasing charge flow to at least one of the multiple vehicles.

8. The method of claim 7, wherein the at least one of the multiple vehicles has at least one of
    a charge level above a predetermined amount of charge; and
    a projected use below a predetermined amount of use.

9. The method of claim 7, wherein the at least one of the multiple vehicles has at least one of:
    relatively high charge level compared to others of the vehicles; and
    relatively low projected use compared to others of the vehicles.

10. The method of claim 7, wherein the charge allocation plan includes decreasing charge flow by different amounts to different ones of the multiple vehicles.

11. The method of claim 1, wherein the charge allocation plan includes deferring the charging of at least one of the multiple vehicles to a later time when there is less load on at least one of the substation and the grid.

12. The method of claim 1, wherein the multiple vehicles are plug-in type electric vehicles.

13. A method for managing the charging of multiple electric vehicles to reduce overall electrical load on a substation, the method comprising:

determining, at the substation, that the substation has reached a power consumption warning threshold;

receiving, at the substation, a charging allocation plan for multiple vehicles being charged within a service area associated with the substation; and distributing, by the substation, electricity to the multiple vehicles being charged according to the plan such that the electrical load, by the multiple electric vehicles during charging, on the substation is reduced.

14. The method of claim 13, wherein distributing electricity to the multiple vehicles being charged according to the charging allocation plan includes reducing the flow of charge to at least one of the multiple vehicles being charged by at least one of a charge controller on the vehicle, a telematics unit equipped on the vehicle, and a smart meter connected to a charging station.

15. The method of claim 13, wherein the charging allocation plan includes prioritizing at least one vehicle being charged over at least one other vehicle being charged based on current charge levels of the vehicles and projected use of the vehicles.

16. The method of claim 13, wherein the charging allocation plan includes prioritizing at least one vehicle being charged over at least one other vehicle being charged based on past charging patterns.

17. A system for managing the charging of electric vehicles being charged to reduce overall electrical load on a substation, the system comprising:

a charging station, adapted to receive electricity from the substation and to charge multiple vehicles connected to the charging station, the substation being adapted to distribute electricity to the multiple vehicles being charged through the charging station; and a call center, adapted to communicate via a network with the substation and at least one of the charging station and the multiple vehicles being charged via the charging station, wherein the call center is further adapted to implement a charging allocation plan such that the electrical load by the multiple vehicles on the substation is reduced, and wherein the call center is particularly configured to perform the steps of:

determining, at a call center, that the substation has reached a warning threshold of power consumption;

identifying, at the call center, the multiple vehicles that are charging in a service area serviced by the substation;

determining, at the call center, a charge level of a batter of each of the multiple vehicles; and implementing, by the call center, a charge allocation plan for charging the multiple vehicles such that the substation is subject to a lower load by the multiple vehicles being charged through the charging station.

18. The system of claim 17, wherein the substation is further adapted to reduce the flow of charge to individual vehicles based on the charging allocation plan.

19. The system of claim 17, wherein the charging allocation plan involves reduction of the flow of charge to at least one vehicle by at least one of a charging station connected to the at least one vehicle and a telematics unit equipped on the at least one vehicle.

20. The system of claim 17, wherein the call center is further adapted to determine the state of charge of each of the vehicles being charged and the charging allocation plan is based on the state of charge of each of the vehicles.

* * * * *